(12) United States Patent
Pritchard (10) Patent No.: US 7,636,817 B1
(45) Date of Patent: Dec. 22, 2009

(54) METHODS AND APPARATUS FOR ALLOWING SIMULTANEOUS MEMORY ACCESSES IN A PROGRAMMABLE CHIP SYSTEM

(75) Inventor: Jeffrey Orion Pritchard, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 645 days.

(21) Appl. No.: 11/406,545

(22) Filed: Apr. 18, 2006

(51) Int. Cl.
- G06F 12/00 (2006.01)
- G06F 13/00 (2006.01)
- G06F 13/28 (2006.01)
- G06F 9/26 (2006.01)
- G06F 9/34 (2006.01)

(52) U.S. Cl. .................. 711/149; 711/157; 711/219

(58) Field of Classification Search .................. 711/149
See application file for complete search history.

(56) References Cited

U.S. PATENT DOCUMENTS 7,426,709 B1 * 9/2008 Ganesan ..................... 716/16

OTHER PUBLICATIONS

Gurindar Singh Sohi, "High-Bandwidth Interleaved Memories for Vector Processors—A Simulation Study", IEEE Transactions on Computers, vol. 42, No. 1, Jan. 1993.*

* cited by examiner

*Primary Examiner*—Matt Kim
*Assistant Examiner*—Ralph A Verderamo, III
(74) *Attorney, Agent, or Firm*—Weaver Austin Villeneuve & Sampson LLP (57) ABSTRACT

Methods and apparatus are provided for allowing simultaneous memory accesses. A generator tool analyzes logic to determine the number of simultaneous memory accesses to the same data structure. Memory is divided into blocks having sequential addresses based on the number of simultaneous memory access specified, e.g. base addresses at A, A+B, A+2B, A+3B. Individual slave side arbiters are assigned to each block of memory. Addresses for memory accesses associated with master components or master ports are modified to allow simultaneous access to multiple memory locations.

24 Claims, 9 Drawing Sheets

METHODS AND APPARATUS FOR ALLOWING SIMULTANEOUS MEMORY ACCESSES IN A PROGRAMMABLE CHIP SYSTEM

BACKGROUND OF THE INVENTION

1. Field of the Invention

The present invention relates to programmable chip systems. In one example, the present invention relates to methods and apparatus for allowing simultaneous memory accesses in a programmable chip system.

2. Description of Related Art

A slave side arbitration fabric associates individual arbiters with slave components in a programmable chip system. When multiple master components request access to slave components, access is no longer restricted by a bus arbiter shared by all components but instead is managed by individual arbiters shared by only master components operable to access the slave component. Consequently, a first master component can access a first slave component while a second master component is accessing a second slave component. The slave side arbitration fabric allows simultaneous accesses in a manner not allowed by conventional bus fabrics.

Along the same lines, it would be desirable to allow simultaneous memory accesses in a programmable chip system. However, mechanisms for efficiently allowing simultaneous memory accesses in a programmable chip system having a slave side arbitration fabric are limited. It is therefore desirable to provide improved methods and apparatus for allowing simultaneous memory accesses.

SUMMARY OF THE INVENTION

Methods and apparatus are provided for allowing simultaneous memory accesses. A generator tool analyzes logic to determine the number of simultaneous memory accesses to the same data structure. Memory is divided into blocks having sequential addresses based on the number of simultaneous memory access specified, e.g. base addresses at A, A+B, A+2B, A+3B. Individual slave side arbiters are assigned to each block of memory. Addresses for memory accesses associated with master components or master ports are modified to allow simultaneous access to multiple memory locations.

In one embodiment, a technique for allowing simultaneous memory accesses in a programmable chip system is provided. A description identifying multiple master ports associated with one or more master components is received. The number of master ports that access the same data structure simultaneously is determined. Multiple memory blocks corresponding to the number of master ports rounded up to the nearest power of two are provided. A simultaneous multiple master component switch fabric is generated to connect the multiple master ports associated with the one or more master components to the multiple memory blocks. The switch fabric includes a slave-side arbiter for each of the multiple memory blocks.

In another embodiment, a system for generating a programmable chip is provided. The system include an input interface, a processor, and an output interface. The input interface is operable to receive a description identifying multiple master ports associated with one or more master components. The processor is operable to determine the number of master ports that access the same data structure simultaneously. The output interface is operable to provide multiple memory blocks corresponding to the number of master ports rounded up to the nearest power of two. The simultaneous multiple master component switch fabric is generated to connect the multiple master ports associated with the one or more master components to the multiple memory blocks. The switch fabric includes a slave-side arbiter for each of the multiple memory blocks.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of programmable chips and logic elements. However, it should be noted that the techniques of the present invention can be applied to different device architectures and a variety of resources. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Programmable chips include a variety of resources that can be allocated for different operations. In some examples, programmable chips include logic elements, preconfigured logic blocks, memory, and processor cores. A computer with a processor core, memory, local area network (LAN) interface, and a universal asynchronous receiver transmitter (UART) can be implemented on a single programmable device such as an FPGA. The programmable device can also include customized logic for performing specialized functions for optimizing a particular application. In one example, logic elements are allocated for implementing a digital signal processing (DSP) core for performing Fast Fourier Transform (FFT) operations. In another example, logic elements are allocated for optimizing video rendering functions.

Many systems implemented on programmable chips include multiple master ports associated with one or more master components. A master port allows an associated component to access a slave port associated with another components. In one example, a processor master port accesses a memory through a memory slave port. Programmable chip interconnection fabrics such as slave side arbitration fabrics allow multiple master ports to access multiple slave ports simultaneously. For example, a first processor can access a first memory component at the same time a second processor can access a second memory component.

The particular architectural characteristics of many programmable chip systems require that memory components hold adjacent address space blocks. For example, a first memory component would hold address lines between A and B while a second memory component would hold address lines between B+n and 2B, where n is the size of a memory line. However, many applications require simultaneous memory accesses to adjacent memory lines or to adjacent memory words. In many programmable chip systems where memory component hold adjacent address space blocks, adjacent memory lines or adjacent memory words are included in the same memory component that uses a single slave port. Breaking up a memory component into smaller memory components would still not help since each resulting memory component would still hold adjacent address space blocks.

Multiport memories allow simultaneous access, but multiport memories are typically expensive. Memory cells that support multiple ports are larger than memory cells of single-port memories. Multiport memories require more programmable interconnect for the multiple ports, even when only a single port is used. Consequently, it is desirable to avoid using multiport memories in many programmable chip systems if possible.

Memory interleaving also allows simultaneous access. Memory interleaving involves assigning assigns consecutive addresses to different physical memories. For example, all even addresses access one memory block and all odd addresses access a second memory block. However, using this approach requires manual analysis of an algorithm and manual decoding of address bits. Furthermore, in many programmable chip systems, interleaved memory component can not be generated because, as noted above, different memory ports are assumed to access adjacent address space blocks, e.g. A to B and B+n to C.

Consequently, the techniques of the present invention automatically determine the number of simultaneous memory accesses required by particular code sequences or algorithms and modify addresses and assign arbiters to various memory components to allow simultaneous memory accesses even when memory components occupy adjacent memory address space blocks. The number of multiple accesses needed is rounded up to the nearest power of two. Separate memory blocks with individual arbiters are provided based on the resulting power of two. Memory accesses to the separate memory blocks are made using simple address rotation. For example, when four arbiters and four memory blocks are used, the right most or least significant two bits associated with an address are rotated to be the left most or most significant two bits associated with the address, e.g. abcdefg is rotated to fgabcde. The rotated most significant two bits determine what memory block to access and allow simultaneous memory accesses to consecutive memory lines.

Figure 1:
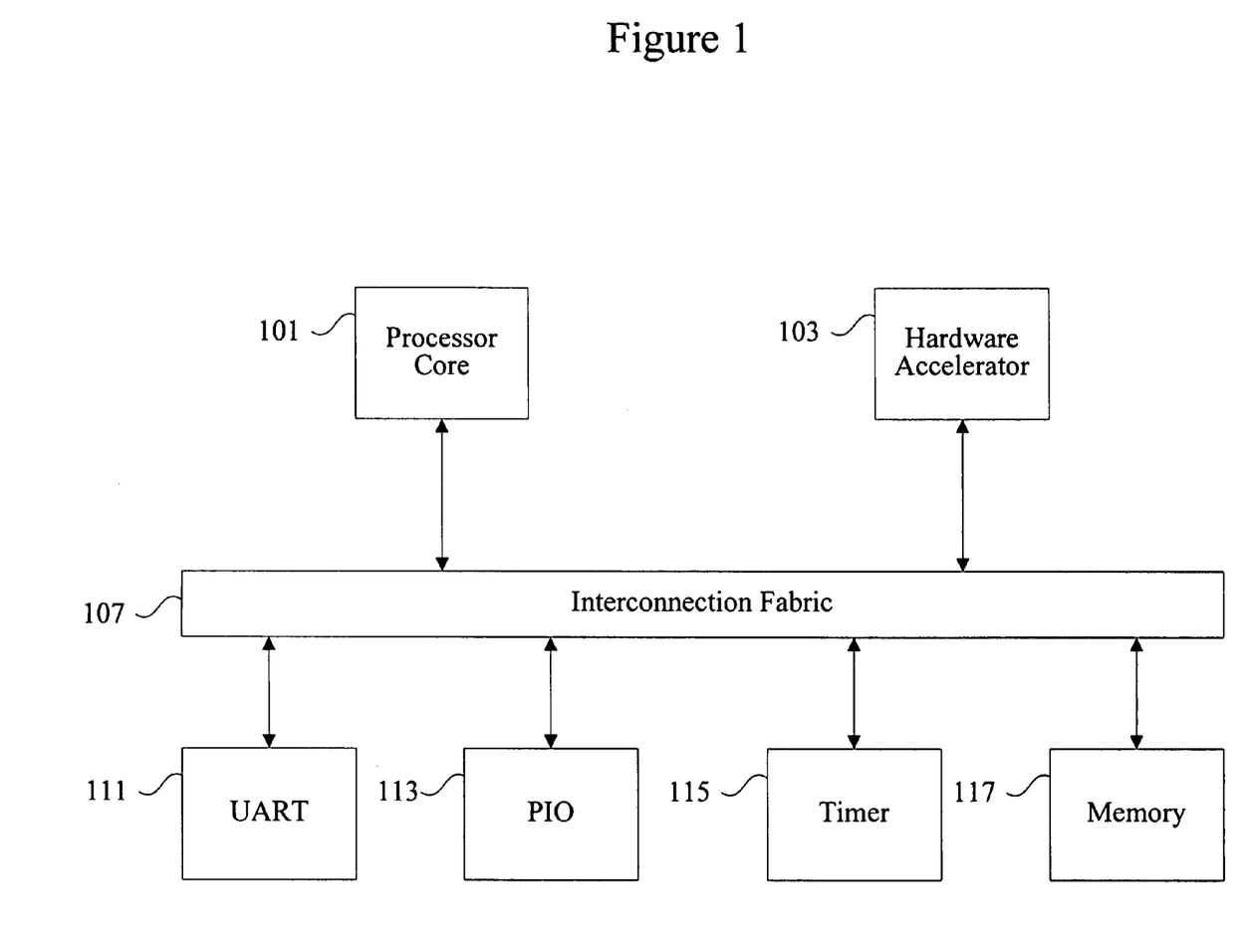
FIG. 1 is a diagrammatic representation showing a programmable device.

FIG. 1 is a diagrammatic representation showing one example of a system on a programmable chip that can implement the techniques of the present invention. The system includes a processor core, a hardware accelerator, peripheral devices, and peripheral interfaces. Peripheral devices and peripheral interfaces are herein referred to as components. The system on a programmable chip includes processor core 101 and a hardware accelerator 103 as well as peripheral components UART 111, PIO 113, timer 115, and data memory 117. In some examples, the hardware accelerator 103 is a Digital Signal Processing (DSP) core, a cryptography accelerator, or a video processor. It should be noted that the system can include both on-chip memory 117 and off-chip memory. In one example, the data memory 117 can support variable latency or fixed latency access. The components are interconnected using an interconnection fabric 107. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip. Some programmable chips also include preconfigured logic blocks as resources that can be allocated in different manners to run various subroutines.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

Figure 2:
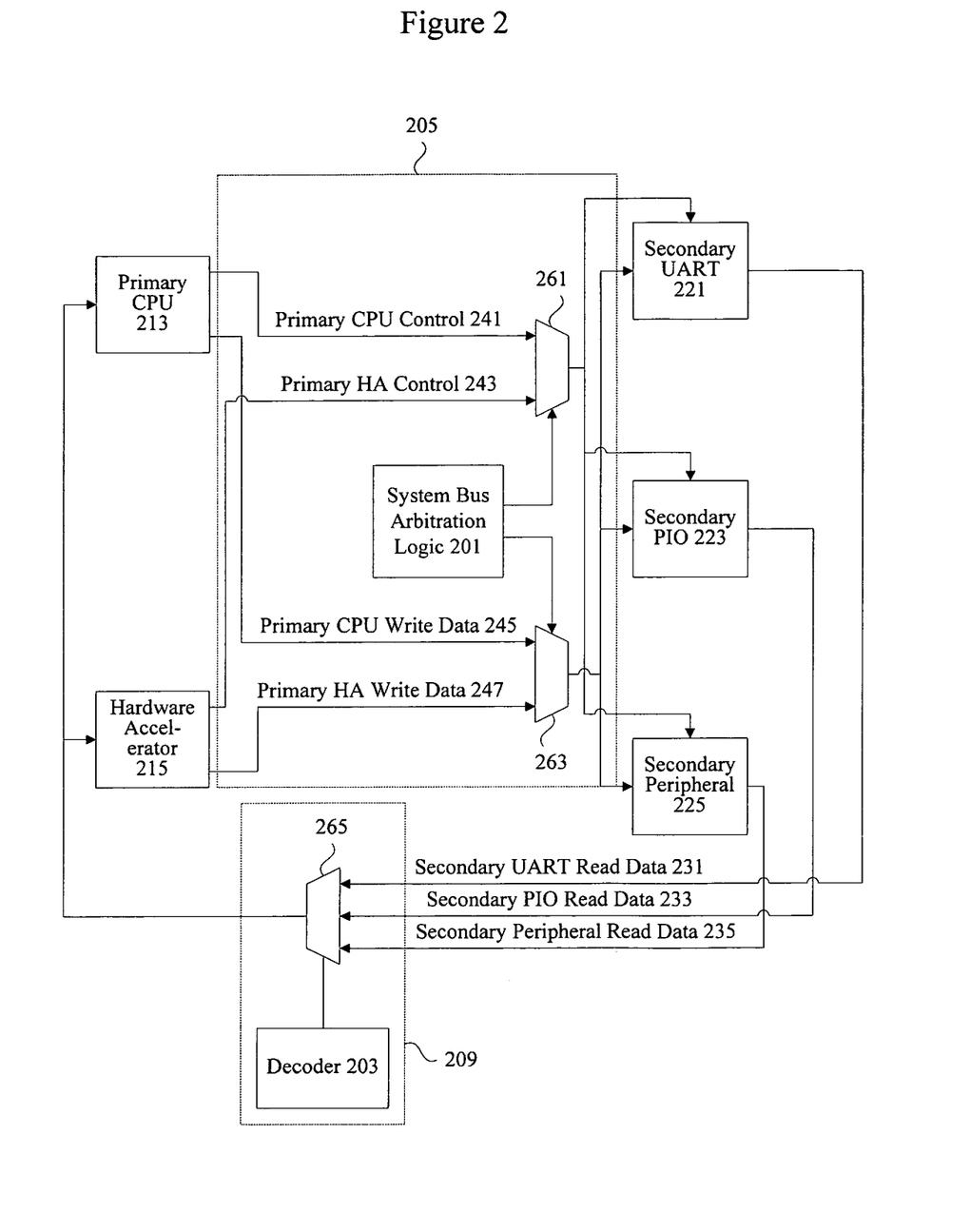
FIG. 2 is a diagrammatic representation showing a conventional bus architecture.

FIG. 2 is a diagrammatic representation depicting a memory coupled to a microprocessor in a system using a conventional bus architecture. Although the techniques of the present invention provide significant performance benefits in a system having a secondary component side arbitration, the techniques can also be used to implement other systems such as conventional system bus implementations.

A conventional bus architecture includes a system bus arbitrator 205. A system bus arbitrator 205 includes arbitrator switching circuitry 261 and 263 as well as system bus arbitration logic 201. Logic and mechanisms for selecting an input based on a bus control signal are referred to herein as arbitration logic. It should be noted that although switching circuitry generally can be implemented using multiplexers, a variety of mechanisms including switches and transistors can be used.

Any component or device that is operable to initiate read and write operations by providing control information is referred to herein as a primary or master component. Control information can include a particular address associated with a secondary component. Any component or device that responds to read or write operations with information sent back to the primary component regarding the read or write operation is referred to herein as a secondary or slave component. Some examples of primary components are processors, microcontrollers, and Ethernet devices. Some examples of secondary components are Universal Asynchronous Receiver Transmitters (UARTs), Parallel Input Output (PIO), program memory, and data memory. It should be noted that some components such as an Ethernet component can be both a primary component and a secondary component, as an Ethernet component has the capability of reading and writing to the secondary program memory while also responding to instructions from a primary system CPU. The various master and slave components include master ports and slave ports that allow interconnection.

Logic and mechanisms for providing the control signal based on criteria such as fairness or priority are referred to herein as arbitration logic. The inputs of the arbitrator switching circuitry 261 and 263 are connected to primary CPU 213 and hardware accelerator 215. The outputs of the arbitrator switching circuitry 261 and 263 are connected to secondary UART 221, secondary PIO 223, and secondary peripheral 225. The secondary peripheral 225 can be a component such as memory. The outputs of the secondary components transmit information such as read data back to the primary components through a decoder 209. Mechanisms for selecting secondary components and translating control information such as addresses is referred to herein as a decoder. In conventional computer systems, there is a single decoder for each bus. A decoder 209 includes decoder logic 203 and decoder switching circuitry 265 for selecting the particular secondary component data transfer. A decoder can also be referred to as a primary side arbitrator including primary side arbitration logic and primary side switching circuitry.

A system bus typically has a set width (e.g. 64 bits, 128 bits) and allows only one primary component to actively use the bus at any one time. In conventional systems, only one primary component can access any one of the given secondary components and any given time. Multiple primary components accessing secondary components in a manner that would cause data bit collisions if performed on the same data lines is referred to herein as accessing secondary components at the same time.

In one example, a hardware accelerator is accessing a secondary PIO. While the hardware accelerator is accessing the secondary PIO, a processor can not access an SDRAM through a peripheral interface even if both the primary streaming output device and the peripheral interface are available.

The system bus arbitration logic 201 determines which primary component has access to the system bus at any time. The system bus arbitrator 201 can determine which primary component can access a secondary component based on criteria such as fairness or priority. Any component or device that is configured to ensure that only one primary component can access any one of the secondary components at any given time is referred to herein as a system bus arbitrator or bus arbitration logic. Various schemes such as weighted fairness can be implemented to improve the efficiency of secondary component access, but such schemes can increase system complexity and latency. In conventional implementations, a computer system includes a single system bus arbitrator for each bus in the computer system.

According to various embodiments, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, performance can be improved using slave side arbitration.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator or slave side arbitrator. In one embodiment, there is a secondary side arbitrator for each secondary component in a computer system. In other embodiments, there is a secondary side arbitrator for selected secondary components in a system. The techniques of the present invention recognize that both primary side arbitration and secondary side arbitration can benefit from more efficient bus arbitration logic.

Figure 3:
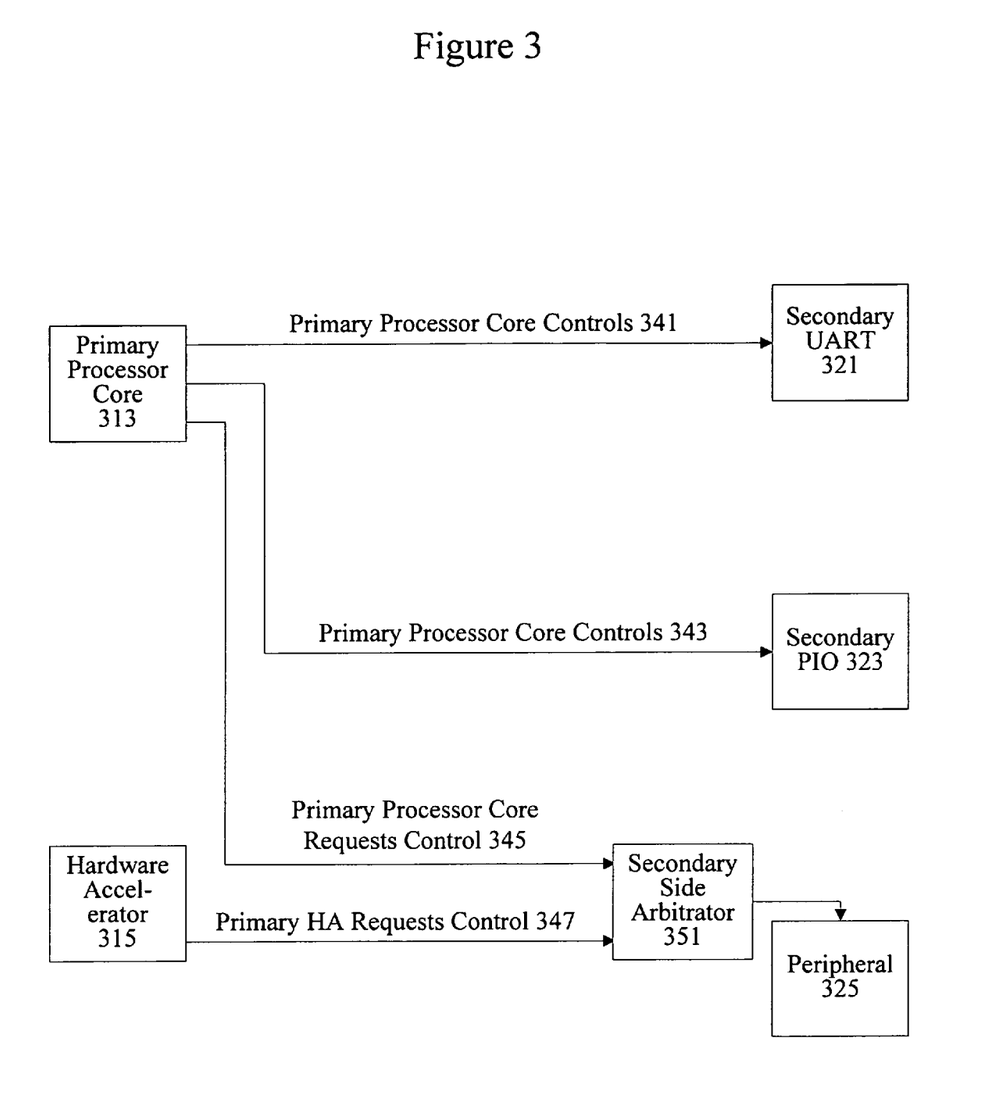
FIG. 3 is a diagrammatic representation showing an interconnection fabric.

FIG. 3 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments a secondary component such as peripheral interface 325 is associated with a secondary side arbitrator 351. However, secondary components UART 321 and PIO 323 are not associated with any arbitrator. In one example, secondary component UART 321 and secondary PIO 323 can only be accessed by primary CPU 313 and not by primary Ethernet device 315. A peripheral interface 325, however, can be accessed by both primary CPU 313 and primary Ethernet device 315.

According to various embodiments, a secondary side arbitrator 351 allows a first secondary component in a system to be accessed by a first primary component at the same time a second secondary component in the system is accessed by a second primary component. For example, peripheral interface 325 can be accessed by primary Ethernet 315 through secondary side arbitrator 351 at the same time, secondary UART 321 is accessed by primary CPU 313.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

In many application, simultaneous access to adjacent memory lines or memory words would be desirable. However, even in a system with slave side arbitration, providing simultaneous access to adjacent memory lines is still not readily achievable. One possible solution is to use a multiport memory that allows multiple simultaneous accesses through its multiple ports.

Figure 4:
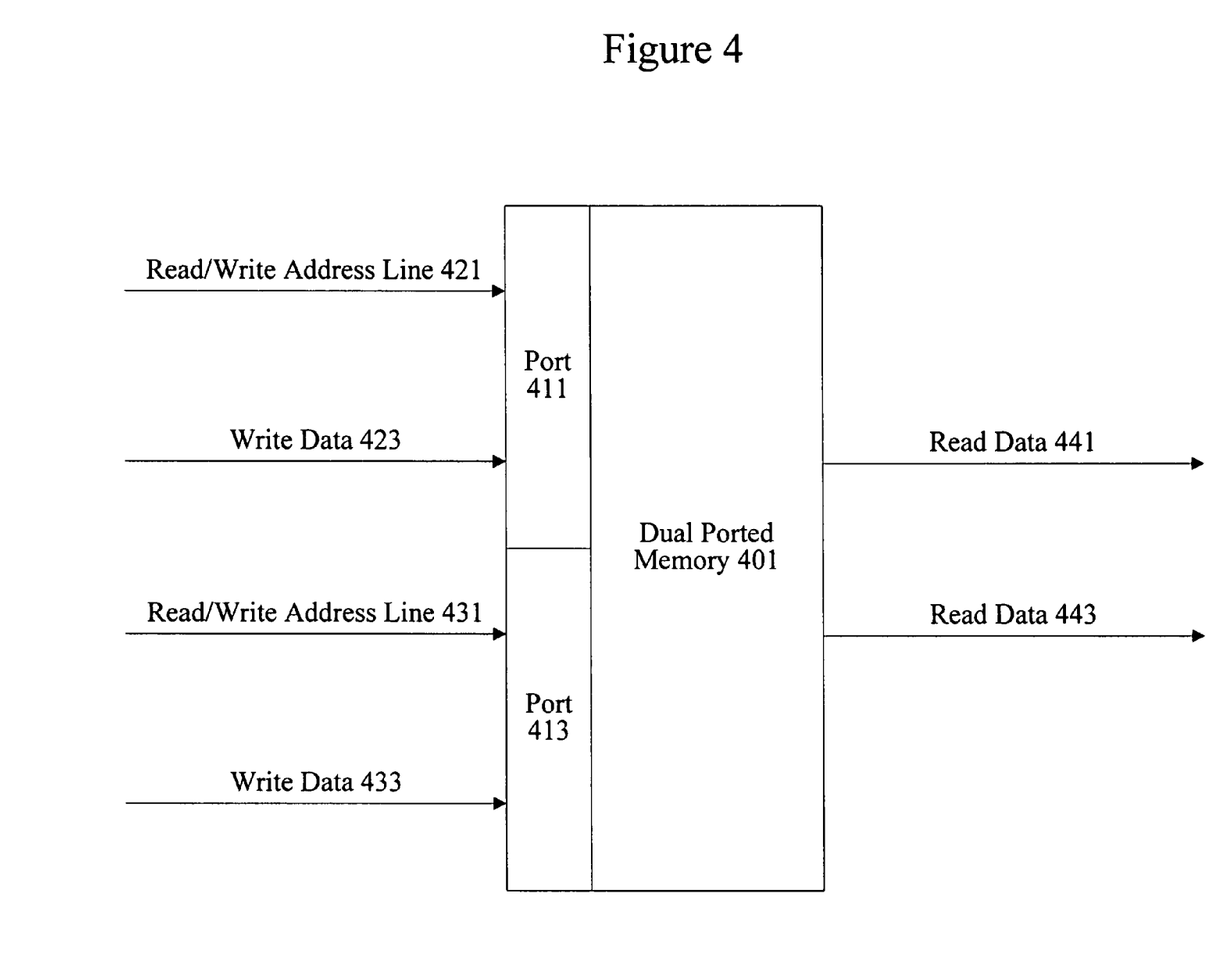
FIG. 4 is a diagrammatic representation showing a multi-port memory.

FIG. 4 is a diagrammatic representation showing one example of a two ported memory. A dual ported memory 401 includes port 411 and port 413. The dual ported memory 401 allows simultaneous access to address lines included in the address space associated with the dual ported memory 401. In one example, read/write address lines 421 and read/write address line 431 provided addresses such as sequential addresses for either write data 423 or read data 441 and write data 433 or read data 443. However, multiport memories are typically expensive to implement and use a large amount of logic on a programmable chip. Memory cells that support multiple ports are larger than memory cells of single-port memories. A multiport memory can also be slower than a single port memory. Multiport memories require more programmable interconnect for the multiple ports, even when only a single port is used. Consequently, it is desirable to avoid using multiport memories in many programmable chip systems when possible.

Figure 5:
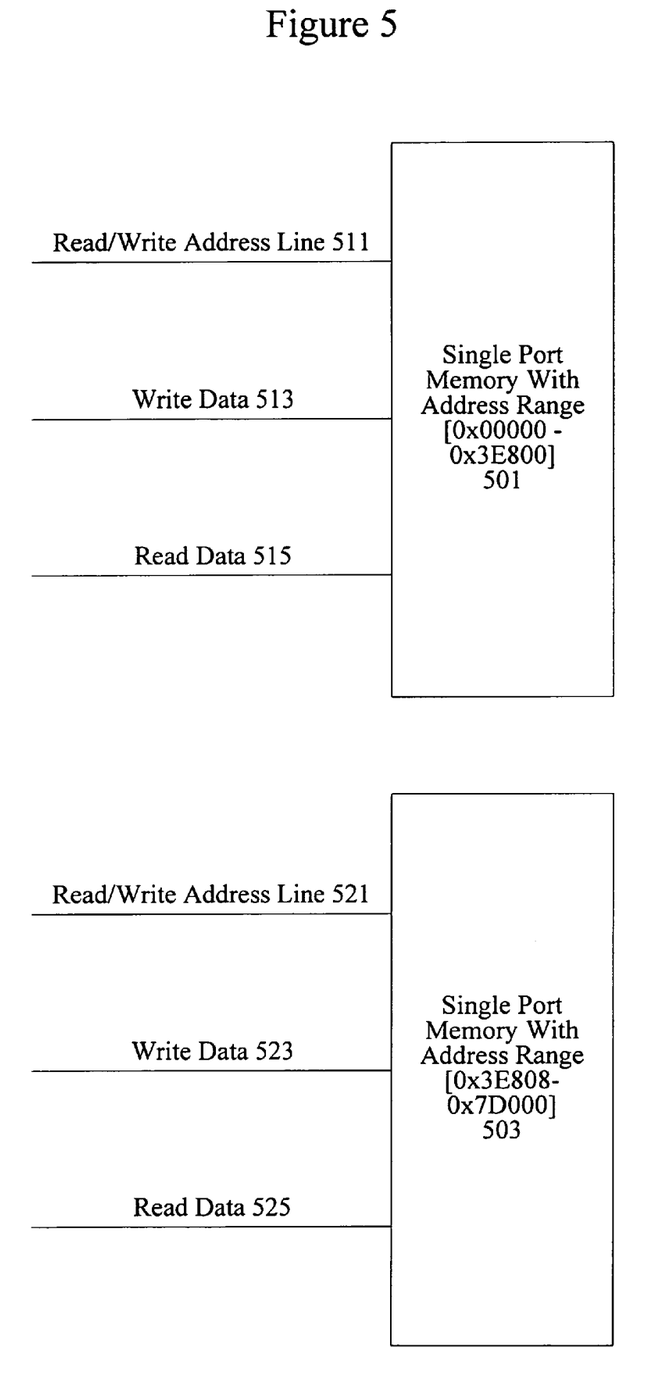
FIG. 5 is a diagrammatic representation showing multiple memory components with sequential addresses.

FIG. 5 is a diagrammatic representation showing two single ported memories having adjacent address ranges or blocks. Single port memory 501 has read/write address line 511 that allows either read access through read data line 515 or write access through write data line 513. Single port memory 503 has read/write address line 521 that allows either read access through read data line 525 or write access through write data line 523. Single port memory 501 has address range 0x00000-0x3E800. Single port memory 503 has address range 0x3E808-0x7D000. The address range 0x00000-0x3E800 is adjacent to the address range 0x3E808-0x7D000. According to various embodiments, each memory line is one byte, although memory lines can vary widely in size. Individual memory lines that follow each other such as 0x00000 and 0x00008 are referred to herein as contiguous or adjacent memory lines. Blocks of memory lines that follow each other such as block 0x00000-0x3E800 and block 0x3E808-0x7D000 are referred to herein as contiguous or adjacent memory address ranges.

A slave side arbitration architecture allows simultaneous access by different master components to memory 501 and memory 503. For example, one processor can accesses memory 501 while a second processor or a hardware accelerator accesses memory 503. However, it is recognized that various algorithms typically could benefit from accessing adjacent memory lines simultaneously. Many conventional architectures only allow simultaneous access to adjacent memory address ranges. For example, many conventional programmable chip architectures only allow access to a memory line in address range 0x00000-0x3E800 and another memory line in address range 0x3E808-0x7D000. However, the techniques of the present invention recognize that it would be beneficial to allow simultaneous access to adjacent memory lines, such as memory lines 0x00000, 0x00008, and 0x0000F simultaneously. Furthermore, the techniques of the present invention recognize that it would be beneficial to determine the number of simultaneous memory accesses needed and to build a memory architecture that supports that specific number of simultaneous memory accesses.

According to various embodiments, the techniques of the present invention determine the number of simultaneous accesses to a particular data structure, such as an array associated with a function. The value is then rounded up to the nearest power of two. For example, if three simultaneous accesses are needed, the value is rounded up to four. If the number is eight, the simultaneous access value is eight. Based on the number of simultaneous accesses, blocks of memory corresponding to the number of simultaneous accesses are provided on a programmable chip. According to various embodiments, each block of memory has an associated slave side arbiter and the blocks of memory have adjacent address ranges.

Figure 6:
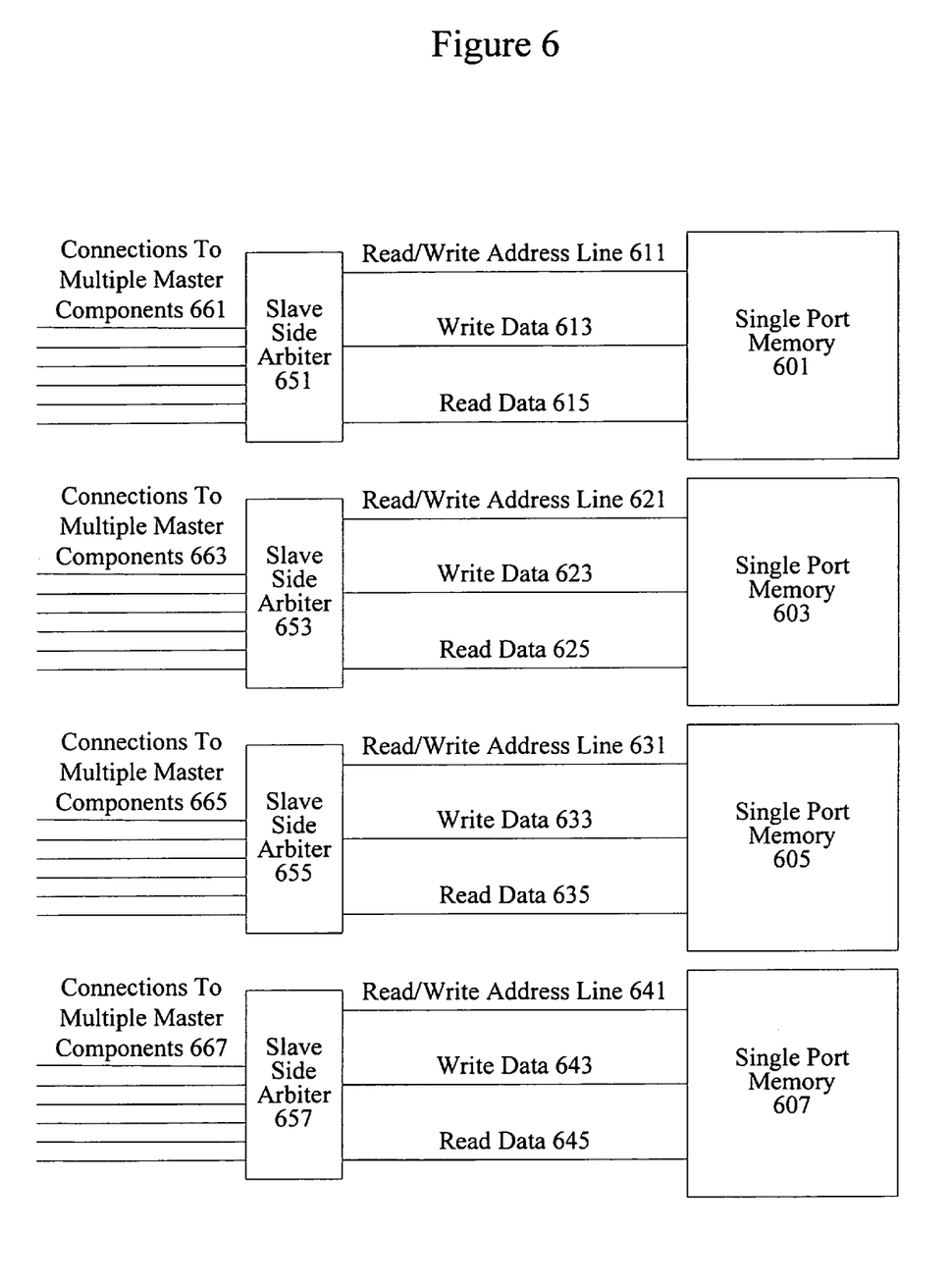
FIG. 6 is a diagrammatic representation showing multiple memory components with associated slave side arbiters.

FIG. 6 is a diagrammatic representation showing blocks of memory having associated slave side arbiters. Address ranges have been simplified for convenience. Single port memory 601 has address range 00000000-00111111. Single port memory 601 is connected to slave side arbiter 651 through read/write address line 611, write data line 613, and read data line 615. Other lines such as control and clock lines may also be included. The slave side arbiter 651 is connected to multiple master components 661. Single port memory 603 has address range 01000000-01111111. Single port memory 603 is connected to slave side arbiter 653 through read/write address line 621, write data line 623, and read data line 625. Other lines such as control and clock lines may also be included. The slave side arbiter 653 is connected to multiple master components 663.

Single port memory 605 has address range 10000000-10111111. Single port memory 605 is connected to slave side arbiter 655 through read/write address line 631, write data line 633, and read data line 635. Other lines such as control and clock lines may also be included. The slave side arbiter 655 is connected to multiple master components 665. Single port memory 607 has address range 0x11000000-11111111. Single port memory 607 is connected to slave side arbiter 657 through read/write address line 641, write data line 643, and read data line 645. Other lines such as control and clock lines may also be included. The slave side arbiter 657 is connected to multiple master components 667. Single port memory 601, 603, 605, and 607 have adjacent memory address ranges. The techniques of the present invention recognize that it is beneficial to provide simultaneous access to adjacent memory lines in a memory space. The slave side arbiters 651, 653, 655, and 657 only allow one particular master component access to the associated memory component. However, different masters can access different memory components simultaneously.

According to various embodiments, the multiple master components can write to consecutive memory lines by performing rotations on memory address for all master component accesses. In one example, an address abcdefgh is rotated to ghabcdef. The least significant bits gh become the most significant bits. The new most significant bits gh determine what single port memory to access. In one particular example, addresses 00001000, 00001001, and 00001010 need to be accessed simultaneously. However, without rotation, addresses 00001000, 00001001, and 00001010 would have to be accessed sequentially on memory 601 through slave side arbiter 651. However, the techniques of the present invention perform a right rotate with carry to move the two least significant bits to the two most significant bit positions. Consequently, addresses 00001000, 00001001, and 00001010 would become 00000010, 01000010, and 10000010. The right rotated addresses would correspond to memory 601, 603, and 605 which can be accessed simultaneously through different arbiters 651, 653, and 655. It should be noted that although a right rotate with carry is described here, a variety of other operations including left rotates can be used to achieve the same result.

In another example, to write to three locations x, x−1, and x+1 in a memory that takes up 1<<n bytes at base address A, four memories are provided. Each memory takes up B=(1<< (n−2)) bytes and base addresses are placed at A, A+B, A+2B, A+3B. The addresses of memory pointers are right rotated with carry. For example, instead of writing to x, ((x & 0x3) <<(n−2)|x>>2 is written. Or instead of writing address abcdefgh, ghabcdef is written. This allows all three memory accesses to be put in memory simultaneously. To write to only x−1 and x+1 at any cycle, only two memories are needed.

Figure 7:
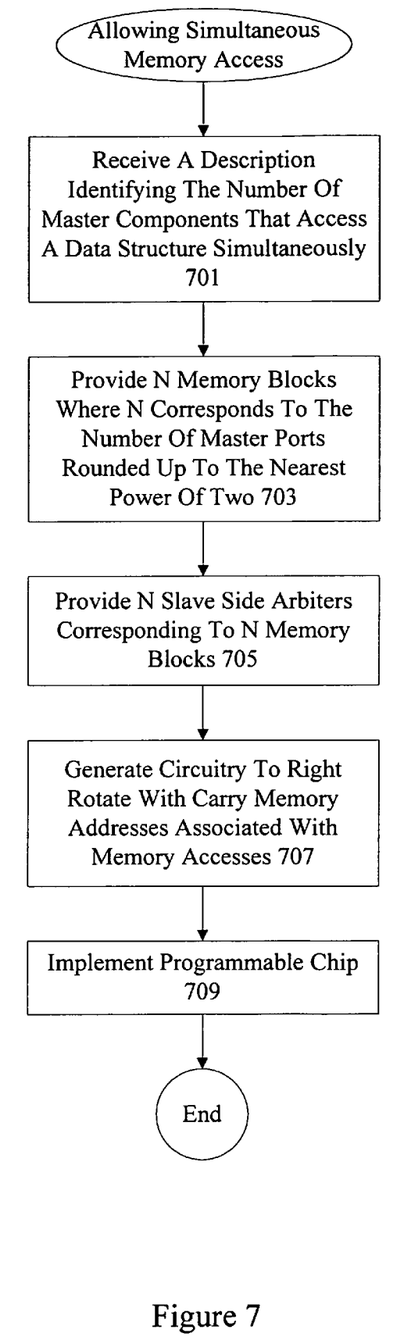
FIG. 7 is a flow process diagram showing a technique for allowing simultaneous memory access.

FIG. 7 is a flow process diagram showing a technique for allowing simultaneous memory access. At 701, a description is received identifying the number of master components that simultaneously access a particular data structure. In one example, the description is high-level language code such as C code that identifies the number of masters that access a particular array associated with a function. In other examples, the description is HDL. At 703, N memory blocks are provided where N corresponds to the number of master ports that access the particular data structure simultaneously rounded up to the nearest power of two. For example, if three simultaneous accesses are needed, four memory blocks are provided.

At 705, slave side arbiters corresponding to the memory blocks are provided. The slave side arbiters allow a first master port to access a first memory block while a second master port accesses a second memory block simultaneously. At 707, circuitry to right rotate with carry addresses associated with all master component memory accesses is generated. In some examples, right rotate with carry is implemented as part of an address decoder. In other examples, the operation is implemented in each master component. At 709, a programmable chip is implemented.

Figure 8:
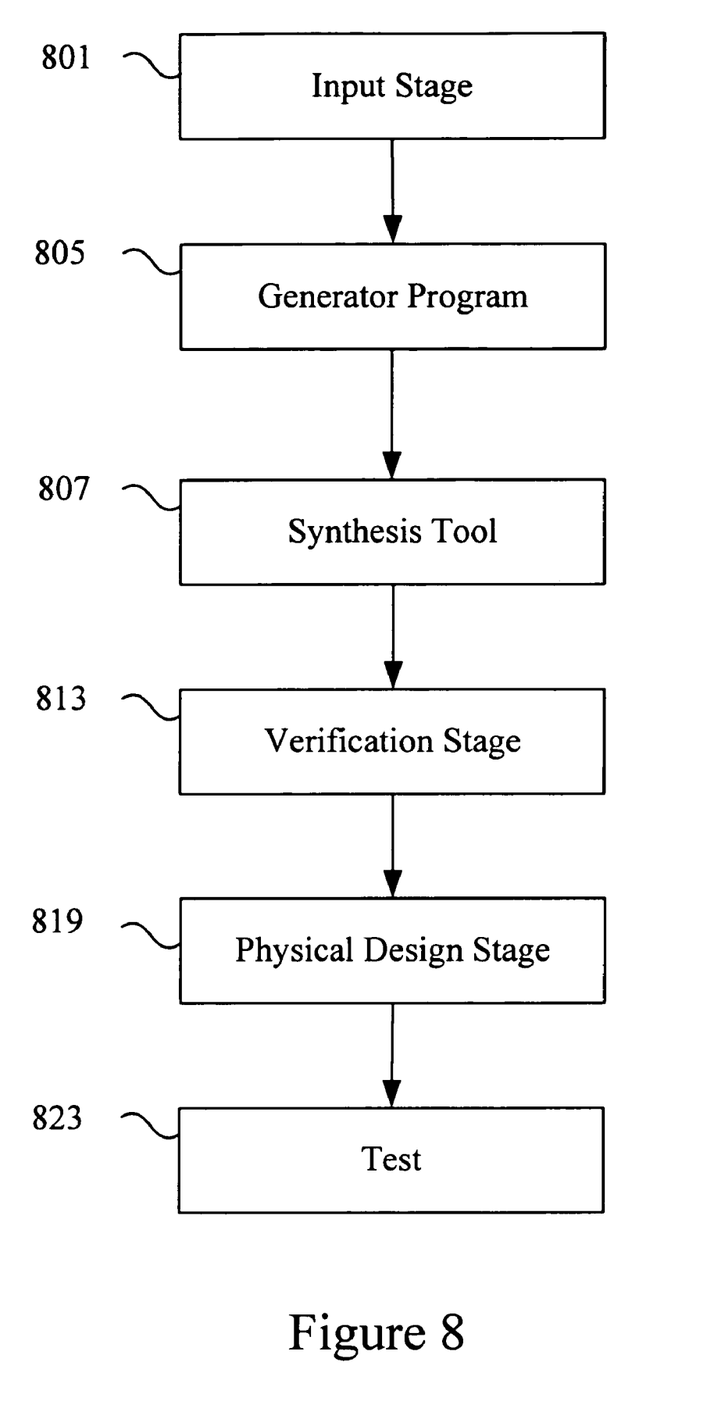
FIG. 8 is a diagrammatic representation showing a technique for implementing the programmable chip.

FIG. 8 is a diagrammatic representation showing implementation of an electronic device that can use arbitration logic according to various embodiments. An input stage 801 receives selection information typically from a user for logic such as a processor core as well as other components such as a streaming output device to be implemented on an electronic device. In one example, the input received is in the form of a high-level language program. A generator program 805 creates a logic description and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. The input stage 801 also allows configuration of variable or fixed latency support. In some examples, components provided to an input stage include intellectual property functions, megafunctions, and intellectual property cores. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various modules selected.

In typical implementations, the generator program 805 can identify the selections and generate a logic description with information for implementing the various modules. The generator program 805 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 805 identifies pointers and provides ports for each pointer. One tool with generator program capabilities is System on a Programmable Chip (SOPC) Builder available from Altera Corporation of San Jose, Calif. The generator program 805 also provides information to a synthesis tool 807 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 809.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description. Similarly, the generator program can provide information directly to the synthesis tool instead of writing HDL files. Similarly, input stage 801, generator program 805, and synthesis tool 807 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A synthesis tool 807 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 813 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device.

Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 813, the synthesized netlist file can be provided to physical design tools 819 including place and route and configuration tools. A place and route tool typically locates logic cells on specific logic elements of a target hardware device and connects wires between the inputs and outputs of the various logic elements in accordance with logic required to implement an electronic design. The device can also be physically tested at 823.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 801, the generator program 805, the synthesis tool 807, the verification tools 813, and physical design tools 819 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 9:
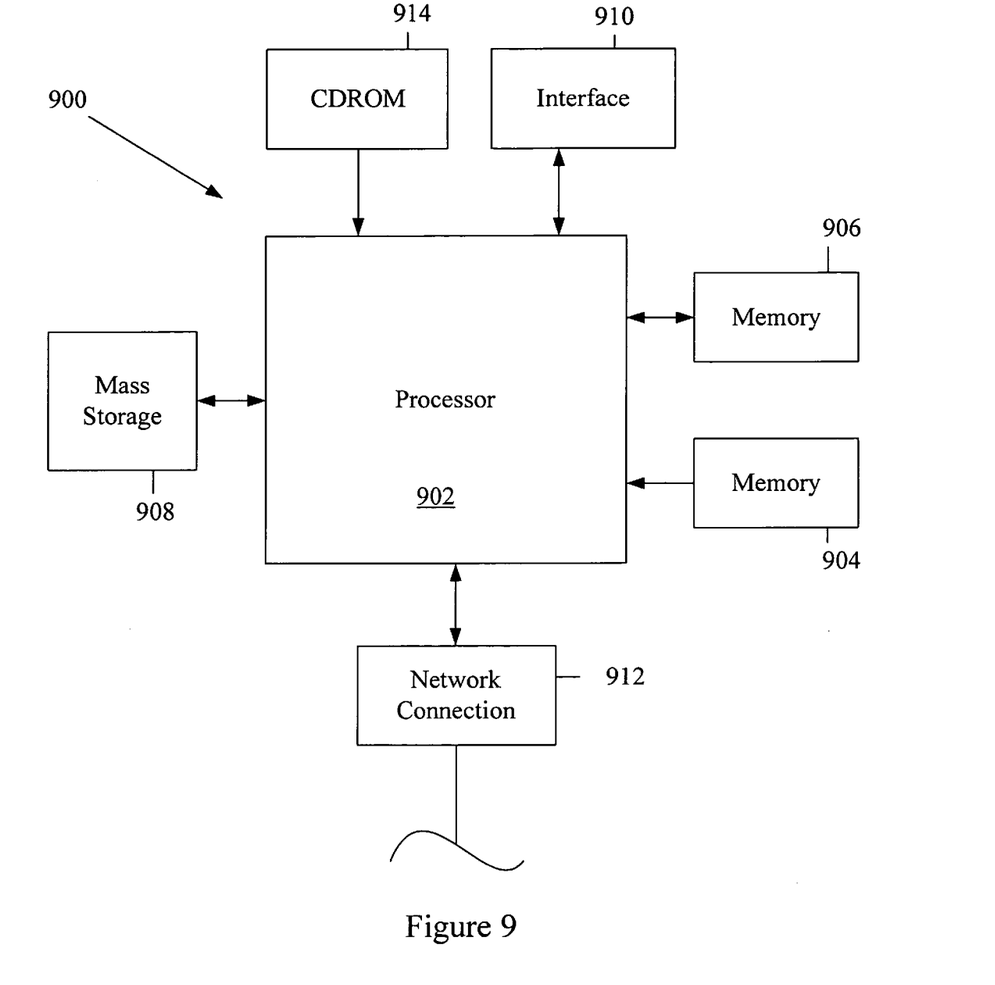
FIG. 9 is a diagrammatic representation depicting a computer system.

FIG. 9 is a diagrammatic representation showing a typical computer system that can be used to implement a programmable chip having bus arbitration with priority encoding and fairness. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to generate a test sequences for any designated processor. As is well known in the art, memory 904 acts to transfer data and instructions uni-directionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 908 or 914 and executed on CPU 908 in conjunction with primary memory 906.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. Although shared I/O lines have been described in the context of a memory controller and a simultaneous multiple primary component switch fabric, shared I/O lines can be used in a system without a memory controller and/or without a simultaneous multiple primary component switch fabric. It is therefore intended that the invention be interpreted to include all variations and equivalents that fall within the true spirit and scope of the claims.

What is claimed is:

1. A method for allowing simultaneous memory accesses in a programmable chip system, the method comprising:
   receiving a description identifying a plurality of master ports associated with one or more master components;
   determining from the description the number of master ports that access the same data structure simultaneously;
   providing a plurality of memory blocks corresponding to the number of master ports rounded up to the nearest power of two; and
   generating a simultaneous multiple master component switch fabric to connect the plurality of master ports associated with the one or more master components to the plurality of memory blocks, wherein the switch fabric includes a slave-side arbiter for each of the plurality of memory blocks.

2. The method of claim 1, wherein the description is a logic description.

3. The method of claim 1, wherein the description is high level language code.

4. The method of claim 1, wherein the description further identifies a first memory component and a second memory component.

5. The method of claim 4, wherein the first memory component includes sequential address lines between addresses X and Y and the second memory component includes sequential address lines between addresses Y+n and Z.

6. The method of claim 5, wherein the first memory component is divided into the plurality of memory blocks corresponding to the number of master ports rounded up to the nearest power of two.

7. The method of claim 6, further comprising rotating addresses associated with memory block accesses from the plurality of master ports to make the plurality of memory blocks appear to be interleaved memory.

8. The method of claim 1, wherein the plurality of memory blocks are provided from physical memory having sequential address lines.

9. The method of claim 1, wherein the plurality of memory blocks comprises four memories, each of which take up B=(1<<(n−2)) bytes with base addresses at A, A+B, A+2B, and A+3B.

10. The method of claim 9, further comprising applying a right rotate with carry to addresses associated with memory block accesses.

11. The method of claim 10, wherein applying the right rotate with carry is performed in the following manner:
(x & 0x3)<<(n−2)|x>>2.

12. The method of claim 1, wherein the data structure is an array associated with a function.

13. The method of claim 1, wherein the programmable chip system includes no multi-port memory components.

14. A system for generating a programmable chip, the system comprising:
an input interface operable to receive a description identifying a plurality of master ports associated with one or more master components;
a processor operable to determine from the description the number of master ports that access the same data structure simultaneously;
an output interface operable to provide a plurality of memory blocks corresponding to the number of master ports rounded up to the nearest power of two;
wherein a simultaneous multiple master component switch fabric is generated to connect the plurality of master ports associated with the one or more master components to the plurality of memory blocks, wherein the switch fabric includes a slave-side arbiter for each of the plurality of memory blocks.

15. The system of claim 14, wherein the description further identifies a first memory component and a second memory component.

16. The system of claim 15, wherein the first memory component includes sequential address lines between addresses X and Y and the second memory component includes sequential address lines between addresses Y+n and Z.

17. The system of claim 16, wherein the first memory component is divided into the plurality of memory blocks corresponding to the number of master ports rounded up to the nearest power of two.

18. The system of claim 17, wherein the addresses associated with memory block accesses from the plurality of master ports are right rotated to make the plurality of memory blocks appear to be interleaved memory.

19. The system of claim 14, wherein the plurality of memory blocks are provided from physical memory having sequential address lines.

20. The system of claim 14, wherein the plurality of memory blocks comprises four memories, each of which take up B=(1<<(n−2)) bytes with base addresses at A, A+B, A+2B, and A+3B.

21. The system of claim 20, wherein right rotate with carry is applied to addresses associated with memory block accesses.

22. The system of claim 21, wherein right rotate with carry is performed in the following manner:
(x & 0x3)<<(n−2)|x>>2.

23. An apparatus, comprising:
means for receiving a description identifying a plurality of master ports associated with one or more master components;
means for determining from the description the number of master ports that access the same data structure simultaneously;
means for providing a plurality of memory blocks corresponding to the number of master ports rounded up to the nearest power of two; and
means for generating a simultaneous multiple master component switch fabric to connect the plurality of master ports associated with the one or more master components to the plurality of memory blocks, wherein the switch fabric includes a slave-side arbiter for each of the plurality of memory blocks.

24. A computer readable medium, comprising:
computer code for receiving a description identifying a plurality of master ports associated with one or more master components;
computer code for determining from the description the number of master ports that access the same data structure simultaneously;
computer code for providing a plurality of memory blocks corresponding to the number of master ports rounded up to the nearest power of two; and
computer code for generating a simultaneous multiple master component switch fabric to connect the plurality of master ports associated with the one or more master components to the plurality of memory blocks, wherein the switch fabric includes a slave-side arbiter for each of the plurality of memory blocks.

* * * * *

UNITED STATES PATENT AND TRADEMARK OFFICE
CERTIFICATE OF CORRECTION

PATENT NO.       : 7,636,817 B1                                   Page 1 of 1
APPLICATION NO. : 11/406545
DATED            : December 22, 2009
INVENTOR(S)      : Jeffrey Orion Pritchard It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 893 days.

Signed and Sealed this

Ninth Day of November, 2010

David J. Kappos
*Director of the United States Patent and Trademark Office*